US008509792B1

(12) United States Patent
Oroskar et al.

(10) Patent No.: US 8,509,792 B1
(45) Date of Patent: Aug. 13, 2013

(54) METHOD AND SYSTEM FOR SELECTING UPLINK AND DOWNLINK FREQUENCIES

(75) Inventors: Siddharth S. Oroskar, Overland Park, KS (US); Sachin R. Vargantwar, Overland Park, KS (US); Matthew S. Telep, Chesapeake, VA (US); Robert D. Carter, Charlotte, NC (US)

(73) Assignee: Sprint Spectrum L.P., Overland Park, KS (US)

( * ) Notice: Subject to any disclaimer, the term of this patent is extended or adjusted under 35 U.S.C. 154(b) by 590 days.

(21) Appl. No.: 12/505,266

(22) Filed: Jul. 17, 2009

(51) Int. Cl.
*H04W 72/00* (2009.01)

(52) U.S. Cl.
USPC ............... 455/450; 455/452.1; 455/422.1; 455/436; 370/328; 370/338

(58) Field of Classification Search
USPC ............... 455/450, 452.1, 422.1, 436, 439; 370/328–338
See application file for complete search history.

(56) References Cited

U.S. PATENT DOCUMENTS

| | | | |
|---|---|---|---|
| 7,302,265 B1 * | 11/2007 | Chalishazar et al. | ......... 455/439 |
| 7,304,979 B2 | 12/2007 | An et al. | |
| 7,437,165 B2 | 10/2008 | Burgess et al. | |
| 2004/0180661 A1 * | 9/2004 | Chen et al. | ............. 455/436 |
| 2006/0094437 A1 | 5/2006 | Sinnarajah et al. | |
| 2006/0281466 A1 | 12/2006 | Gholmieh et al. | |
| 2007/0076663 A1 * | 4/2007 | Qi et al. | ................. 370/331 |
| 2008/0013654 A1 * | 1/2008 | Rick et al. | ............. 375/345 |
| 2009/0186627 A1 * | 7/2009 | Zhang | ..................... 455/453 |
| 2011/0044222 A1 * | 2/2011 | Gerstenberger et al. | ...... 370/311 |
| 2011/0081940 A1 * | 4/2011 | Gerstenberger et al. | ...... 455/522 |

OTHER PUBLICATIONS

GSM frequency bands—Wikipedia, the free encyclopedia, This is an old revision of this page, as edited by 200.55.206.18 (talk) at 11;55, Jul. 15, 2008. It may differ significantly from the current revision (http://en.wikipedia.org/wiki/GSM_frequency_bands).*
U.S. Appl. No. 12/371,873, filed Feb. 16, 2009, titled "Intelligent System Selection in an Underlay-and-Overlay Scenario".

* cited by examiner

*Primary Examiner* — Chuong A Ngo

(57) ABSTRACT

A mobile station receives at least one frequency listing that identifies M downlink frequencies that may be used to receive communications from a wireless telecommunications network and N uplink frequencies that may be used to transmit communications to the wireless telecommunications network (M and N are integers greater than one). The mobile station selects a downlink frequency from among the M downlink frequencies and selects an uplink frequency from among the N uplink frequencies, independently of the downlink frequency. To make these selections, the mobile station may use a downlink hashing algorithm to map an identifier of the mobile station (such as MDN, MIN, IMSI, or ESN) to one of the M downlink frequencies and an uplink hashing algorithm to map the identifier to one of the N uplink frequencies.

19 Claims, 3 Drawing Sheets

METHOD AND SYSTEM FOR SELECTING UPLINK AND DOWNLINK FREQUENCIES

BACKGROUND

To support wireless communication between a mobile station and a wireless telecommunications network, multiple frequencies may be used. For example, when frequency division duplexing (FDD) is used, uplink communications (communications from the mobile station to the network) and downlink communications (communications from the network to the mobile station) occur at different frequencies.

The separation between uplink and downlink frequencies may depend on the frequency ranges that are used. As one example, the PCS frequency band that is often used for cellular communications includes an uplink band of 1850-1910 MHz and a downlink band of 1930-1990 MHz. For FDD communications, an uplink carrier frequency in the uplink PCS band is typically paired with a downlink carrier frequency in the downlink PCS band, with a frequency separation between the uplink and downlink carrier frequencies of 80 MHz.

A given pair of uplink and downlink carrier frequencies may be used to support wireless communications with multiple mobile stations in multiple areas. For example, in code division multiple access (CDMA) approaches, the uplink and downlink carriers may be separately modulated with a plurality of different codes to define a plurality of distinct downlink communication channels (such as paging channels and downlink traffic channels) and a plurality of distinct uplink communication channels (such as access channels and uplink traffic channels). The distinct communication channels defined in this way enable communications between multiple mobile stations and the wireless network to occur simultaneously in the same area using only one uplink carrier frequency and one downlink carrier frequency.

In order to increase capacity, wireless telecommunications network are increasingly using multiple uplink carrier frequencies and multiple downlink carrier frequencies in the same wireless coverage area (e.g., a particular cell or sector). As a result, in a given wireless coverage area, some mobile stations may use one pair of uplink and downlink carrier frequencies, while other mobile stations may use a different pair of uplink and downlink carrier frequencies.

It is often desirable to balance the usage of the different carriers that are available. In a conventional approach for load balancing in a given wireless coverage area, the network broadcasts a channel list message (over a paging channel) that identifies the downlink carrier frequencies that are available in that wireless coverage area. Each mobile station operating in the wireless coverage area then uses a selection algorithm to select one of the downlink carrier frequencies. The selection algorithm is typically a hashing algorithm that maps an identifier of the mobile station to one of the downlink carrier frequencies. As a result, the usage of the downlink carrier frequencies available in a given wireless coverage area can be spread out relatively evenly among the different mobile stations operating in the area.

Conventionally, once a mobile station has selected a downlink carrier frequency, the mobile station automatically uses a corresponding uplink carrier frequency, based on the standard frequency separation between uplink and downlink carrier frequencies. For example, when PCS bands are used, the standard frequency separation is typically 80 MHz, as noted above. In this way, the usage of both downlink carrier frequencies and uplink carrier frequencies can be balanced.

Overview

In a first principal aspect, an exemplary embodiment provides a method for a mobile station in communication with a wireless telecommunications network. In accordance with the method, the mobile station receives at least one frequency listing from a base station in the wireless telecommunications network, the at least one frequency listing identifying a plurality of carrier frequencies The mobile station selects a first carrier frequency in the plurality of carrier frequencies, for receiving messages from the base station. The mobile station selects a second carrier frequency in the plurality of carrier frequencies, for transmitting messages to the base station.

In a second principal aspect, an exemplary embodiment provides a method for a mobile station in communication with a wireless telecommunications network. In accordance with the method, the mobile station selects a downlink frequency from among M available downlink frequencies (M is an integer greater than one). The mobile station selects an uplink frequency from among N available uplink frequencies (N is an integer greater than one), independently of the downlink frequency.

In a third principal aspect, an exemplary embodiment provides a mobile station that comprises a transceiver, for transmitting and receiving communications, and a controller. The controller is configured to: (a) receive at least one frequency listing via said transceiver, the at least one frequency listing identifying a plurality of carrier frequencies; (b) select a first carrier frequency in the plurality of carrier frequencies for receiving communications via the transceiver; and (c) select a second carrier frequency in the plurality of carrier frequencies for transmitting communications via the transceiver.

DETAILED DESCRIPTION OF EXEMPLARY EMBODIMENTS

1. Introduction

The inventors have recognized that the conventional approach, in which a mobile station selects a downlink carrier frequency and then automatically uses an uplink carrier frequency that is paired with the selected downlink carrier frequency, can lead to inefficiencies, particularly when neighboring areas have different sets of available carrier frequencies. To explain this neighboring area problem, FIG. 1 schematically illustrates an exemplary configuration in which a sector that has three pairs of carrier frequencies is adjacent to sectors that have only two pairs of carrier frequencies.

Figure 1:
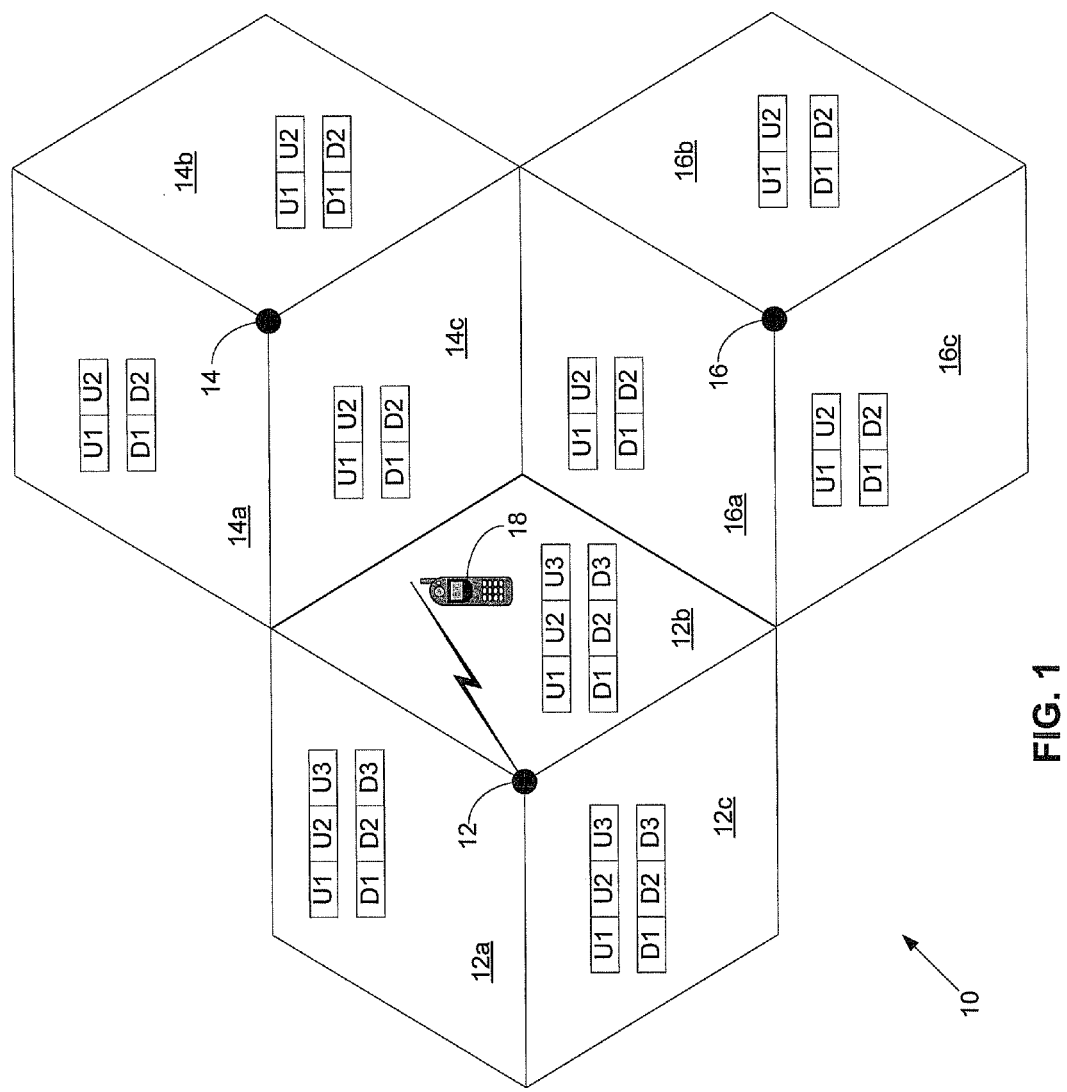
FIG. 1 is a schematic diagram illustrating part of a wireless telecommunications network, in accordance with an exemplary embodiment.

More particularly, FIG. 1 shows part of a wireless telecommunications network 10 that includes base stations 12, 14, and 16. Each base station has three sectors: base station 12 has sectors 12a, 12b, and 12c; base station 14 has sectors 14a, 14b, and 14c; and base station 16 has sectors 16a, 16b, and 16c. Each of the sectors of base station 12 can use three uplink carrier frequencies (U1, U2, and U3) and three downlink carrier frequencies (D1, D2, and D3). However, the sectors of base station 14 and base station 16 can use only two uplink carrier frequencies (U1 and U2) and two downlink carrier frequencies (D1 and D2). The configuration of FIG. 1 shows how neighboring sectors can have different numbers of available carrier frequencies. For example, sector 12b, which has three pairs of carrier frequencies, is adjacent to sectors 14c and 16a, each of which has only two pairs of carrier frequencies.

Having a different number of available carrier frequencies in adjacent sectors can result in inter-frequency handoffs. Such inter-frequency handoffs are usually undesirable because they are typically "hard" handoffs (break-before-make handoffs) that can lead to a higher risk for dropped calls than "soft" handoffs. For example, FIG. 1 shows a mobile station 18 operating in sector 12b. If mobile station 18 is in communication with base station 12 using uplink frequency U3 and downlink frequency D3 but then moves into sector 14c or sector 16a, an inter-frequency handoff to uplink/downlink frequencies U1/D1 or U2/D2 may result.

One way to reduce the likelihood of such inter-frequency handoffs would be to limit the downlink carrier frequencies that are identified in the channel list message broadcast in sector 12b, so that only the downlink frequencies in common with neighboring sectors are included. For example, the channel list message broadcast in sector 12b might identify only D1 and D2, the downlink carrier frequencies that are available in sectors 14c and 16a. That approach can reduce the likelihood of inter-frequency handoffs, but it would also lead to a higher usage of D1 and D2, including higher paging channel occupancies for D1 and D2.

As an alternative, the inventors propose an approach in which a mobile station selects both an uplink carrier frequency and a downlink carrier frequency. That way, a wireless telecommunications network can offer a more efficient combination of uplink and downlink frequencies than would be the case if a corresponding uplink frequency is automatically paired with a selected downlink frequency. For example, if mobile station 18 in sector 12b selects D1 as the downlink carrier frequency it will use (e.g., using a hashing algorithm), then mobile station 18 might make an independent selection of uplink carrier frequency (e.g., by using either the same or different hashing algorithm), rather than automatically using U1 as the corresponding uplink carrier frequency.

With mobile stations selecting both uplink and downlink carrier frequencies, a base station may broadcast a channel list message that identifies both the uplink and downlink carrier frequencies that are available in that wireless coverage area. Alternatively, a base station may broadcast an uplink channel list message that identifies uplink carrier frequencies and a downlink channel list channel that identifies downlink carrier frequencies.

For example, in the configuration illustrated in FIG. 1, base station 12 might broadcast a channel list message for sector 12b that identifies uplink carrier frequencies U1 and U2 and downlink carrier frequencies D1, D2, and D3. A mobile station, such as mobile station 18, may receive the channel list message and responsively select a downlink carrier frequency from among D1, D2, and D3 (e.g., using a downlink hashing algorithm) and also select an uplink carrier frequency from among U1 and U2 (e.g., using an uplink hashing algorithm).

In this way, all three downlink carrier frequencies could be made available to mobile stations operating in sector 12b (resulting in a lower paging channel occupancy than if only D1 and D2 were to be made available). But since uplink carrier frequency U3 is not identified in the channel list message, mobile stations would generally not use U3 to originate calls in sector 12b. As a result, the likelihood that a call using uplink/downlink frequencies U3/D3 would undergo an inter-frequency handoff from sector 12b to sector 14c or 16a may be beneficially reduced. It is to be understood, however, that uplink/downlink frequencies U3/D3 might still be used for calls that originated in another sector (such as sector 12a or 12c) and were subsequently handed off to sector 12b.

More generally, a mobile station may select a downlink carrier frequency from among M available downlink frequencies and may select an uplink carrier frequency from among N available uplink frequencies (where M and N are integers greater than one). The M available downlink frequencies and N available uplink frequencies for a given wireless coverage area (such as a cell or sector) could be identified in one or more frequency listings (such as channel list messages) transmitted by a base station. As in the example described above, the number of available of downlink frequencies may be greater than the number of available uplink frequencies (i.e., M may be greater than N). Alternatively, M could be equal to N, or M could be less than N.

Preferably, the mobile station selects the uplink carrier frequency independently of the downlink carrier frequency. For example, the mobile station may use a downlink hashing algorithm to select the downlink carrier frequency and may use an uplink hashing algorithm to select the uplink carrier frequency. As a result, the frequency separation between the uplink and downlink frequencies selected by the mobile station need not correspond to the standard frequency separation. For example, if PCS bands are used in the configuration illustrated in FIG. 1, there would be the standard frequency separation of 80 MHz between U1 and D1, between U2 and D2, and between U3 and D3. But if a mobile station selects U1 and D2, the resulting frequency separation would be more than 80 MHz, and if a mobile station selects U2 and D1, the resulting frequency separation would be less than 80 MHz.

By allowing a mobile station to select both the uplink carrier frequency and the downlink carrier frequency, a wireless telecommunications network may be able to use radio frequency (RF) resources more efficiently.

2. Exemplary Method of Operation

Figure 2:
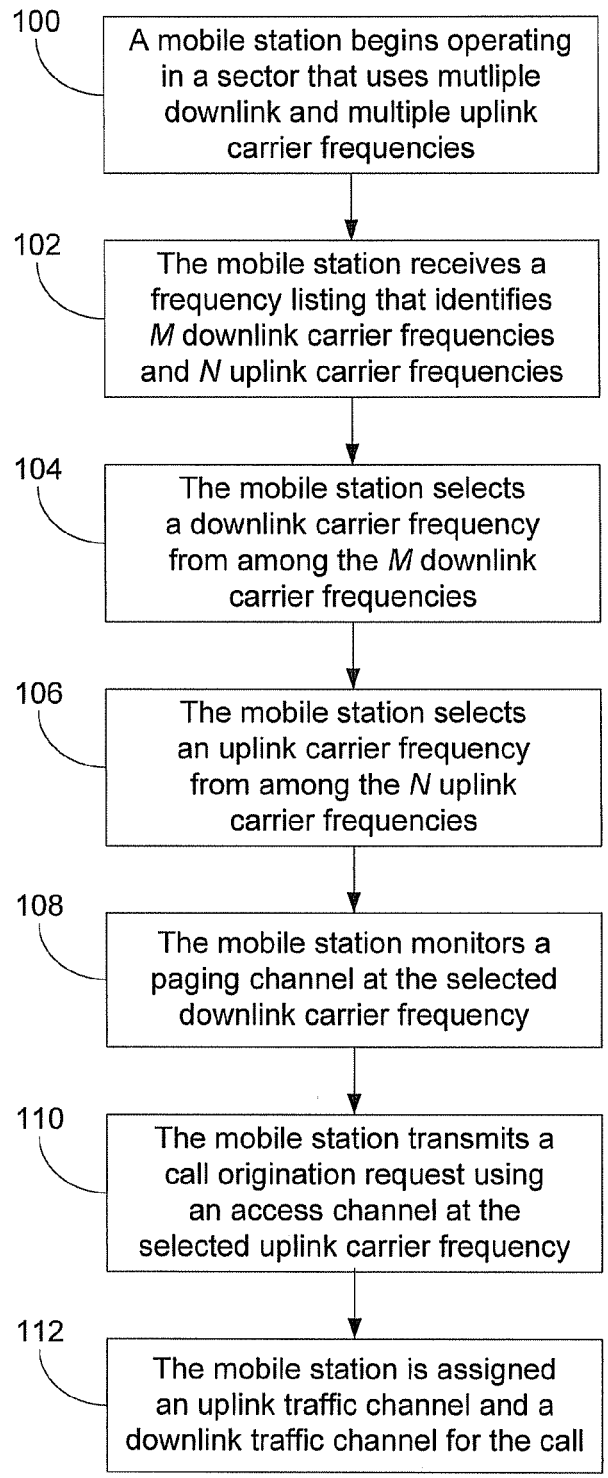
FIG. 2 is a flow chart illustrating a method of operation, in accordance with an exemplary embodiment.

FIG. 2 is a flow chart illustrating an exemplary method of operation. For purposes of illustration, the method is described with reference to the configuration shown in FIG. 1. It is to be understood, however, that other configurations could be used.

In this exemplary method, a mobile station begins operating in a sector that uses multiple downlink carrier frequencies and multiple uplink carrier frequencies, as indicated by block 100. For example, mobile station 18 may begin operating in sector 12b (e.g., by powering up in sector 12b or moving into sector 12b while in an idle state). The mobile station could be a wireless telephone, wireless personal digital assistant, wirelessly-equipped laptop computer, or other wireless communication device. The wireless communications supported in the sector may use an air interface format such as 1xRTT CDMA, EVDO, GSM, or any other format in which separate carrier frequencies are used for uplink and downlink communications.

The mobile station receives a frequency listing that identifies M downlink carrier frequencies and N uplink carrier frequencies available in that sector, as indicated by block 102. M and N are integers greater than one. For example, a frequency listing for sector 12b may identify downlink carrier frequencies D1, D2, and D3 and uplink carrier frequencies U1 and U2, whereby M=3 and N=2.

The frequency listing could be, for example, a channel list message that a base station (e.g., base station 12) broadcasts over a paging channel. The frequency listing may identify the carrier frequencies either directly or indirectly, such as by referencing standardized frequency channel numbers or frequency bands. The frequency listing may specify which carrier frequencies are for uplink and which are for downlink. Alternatively, the mobile station may determine whether an identified carrier frequency is for uplink or for downlink, for example, based on whether the identified carrier frequency falls within a standard uplink frequency band or a standard downlink frequency band. In some cases an identified carrier frequency could be used for both uplink and downlink, for example, by using time division duplexing (TDD).

After receiving the frequency listing, the mobile station selects a downlink carrier frequency from among the M downlink carrier frequencies, as indicated by block 104. To make this selection, the mobile station may use a downlink hashing algorithm that maps an identifier of the mobile station to one of the M downlink carrier frequencies. The identifier could be, for example, a Mobile Directory Number (MDN), Mobile Identification Number (MIN), International Mobile Subscriber Identity (IMSI), or Electronic Serial Number (ESN).

In an exemplary embodiment, the downlink hashing algorithm generates a numerical result from 0 to 1 based on the mobile station's identifier. The numerical result is mapped to an index, i, that picks out the $i^{th}$ downlink carrier frequency in the set of M downlink carrier frequencies. Thus, for the case that M=3, a result between 0 to $\frac{1}{3}$ would map to the first downlink carrier frequency, a result between $\frac{1}{3}$ and $\frac{2}{3}$ would map to the second downlink carrier frequency, and a result between $\frac{2}{3}$ and 1 would map to the third downlink carrier frequency.

The mobile station also select an uplink carrier frequency from the N uplink carrier frequency, as indicated by block 106. To make this selection, the mobile station may use an uplink hashing algorithm that maps an identifier of the mobile station to one of the N uplink carrier frequencies. The uplink hashing algorithm could be the same as, or similar to, the downlink hashing algorithm. However, the uplink hashing algorithm may select from a different number of choices than the downlink hashing algorithm. For example, with M=3 and N=2, the downlink hashing algorithm may select from three different choices whereas the uplink hashing algorithm may select from two different choices.

Thus, in the N=2 example, the uplink hashing algorithm may generate a numerical result from 0 to 1 based on the mobile station's identifier (either the same identifier used by the downlink hashing algorithm or a different identifier). A result between 0 and $\frac{1}{2}$ would map to the first uplink carrier frequency, and a result between $\frac{1}{2}$ and 1 would map to the second uplink carrier frequency. In this way, the mobile station may select an uplink carrier frequency independently of the downlink carrier frequency.

With the downlink carrier frequency now selected, the mobile station may begin monitoring a paging channel at the selected downlink carrier frequency, as indicated by block 108. With the uplink carrier frequency now selected, the mobile station may also use an access channel at the selected uplink carrier frequency to transmit one or more messages to the network. For example, the mobile station may transmit a call origination request using an access channel at the selected uplink carrier frequency, as indicated by block 110. In response, the network may assign the mobile station an uplink traffic channel and a downlink traffic channel for the call, as indicated by block 112.

In an exemplary embodiment, the uplink traffic channel uses the uplink carrier frequency selected by the mobile station. But the downlink traffic channel may use either the downlink carrier frequency selected by the mobile station or a different carrier frequency. For example, in order to provide compatibility with other sectors, the downlink traffic channel might use a downlink carrier frequency that is normally paired with the mobile station's selected uplink carrier frequency, so that the uplink and downlink carrier frequencies used for the call have the standard frequency separation between them. In that case, if the mobile station has selected U2 as the uplink carrier frequency and D1 as the downlink carrier frequency, the uplink traffic channel assigned for the call would use U2 as the uplink carrier frequeny, but the downlink traffic channel would use D2, instead of D1, as the downlink carrier frequency.

In this way, a mobile station may select an uplink carrier frequency independently of the downlink carrier frequency. Thereafter, the mobile station may use the selected uplink carrier frequency to originate calls or otherwise access the wireless network. It is to be understood, however, that the method illustrated in FIG. 2 is exemplary only. For example, instead of receiving a frequency listing that identifies both the downlink carrier frequencies and the uplink carrier frequencies, the mobile station may receive a listing of the downlink carrier frequencies and a separate listing of the uplink carrier frequencies. In addition, other variations on the method of FIG. 2 are possible.

3. Exemplary Mobile Station

Figure 3:
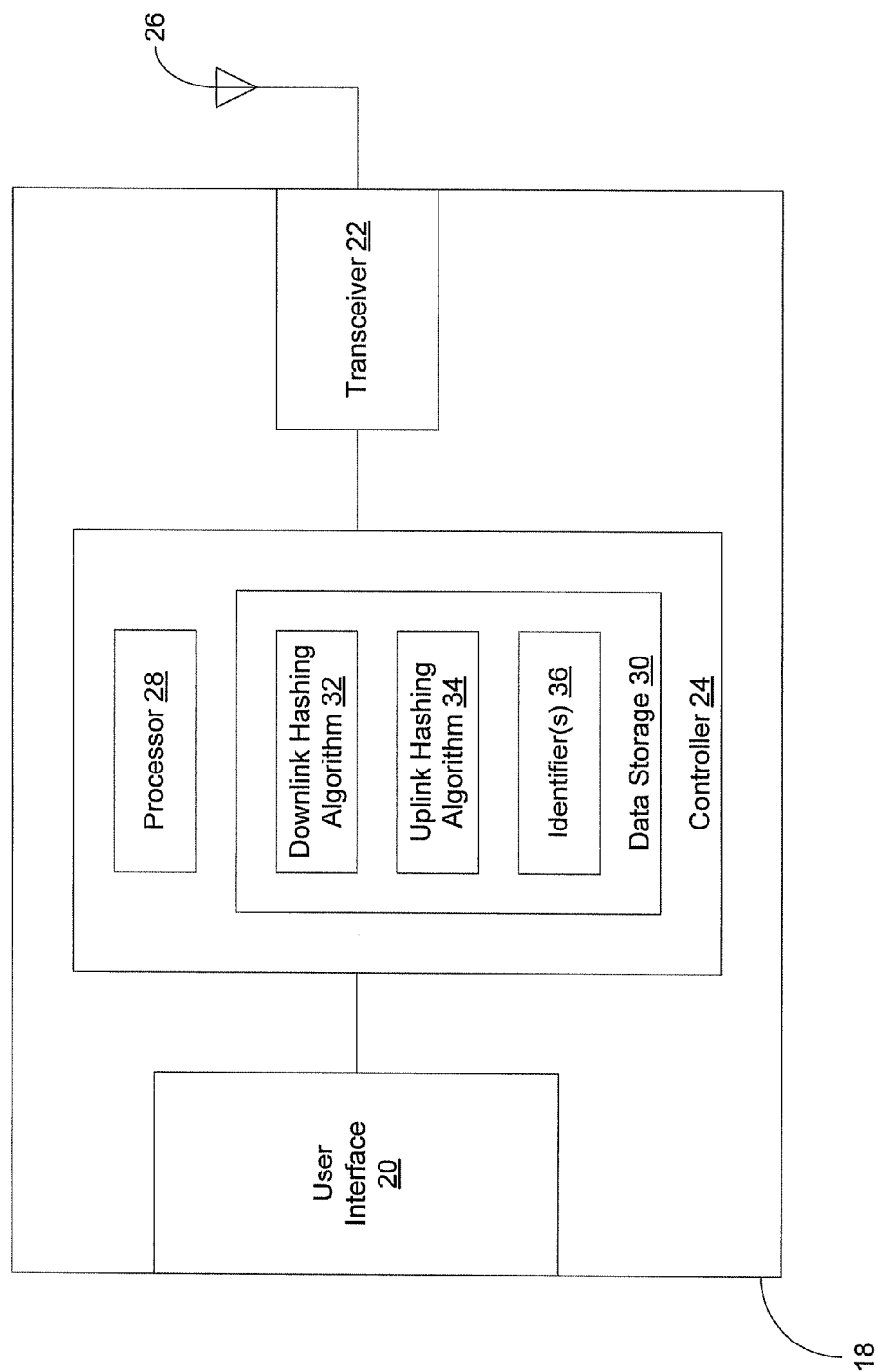
FIG. 3 is a block diagram illustrating a mobile station, in accordance with an exemplary embodiment.

FIG. 3 illustrates an exemplary configuration of mobile station 18. As shown in FIG. 3, mobile station 18 may include a user interface 20, a transceiver 22, and a controller 24.

The user may interact with mobile station 18 through the user interface 20. For example, user interface 20 may include a speaker for conveying voice or other audio to a user and may include a microphone for receiving voice or other audio from a user. Alternatively, mobile station 18 may be communicatively coupled to an external speaker and/or microphone. User interface 20 may also include a display for displaying visual information, such as text, graphics, or video. In some cases, the display may include a touch screen for receiving tactile input from the user, for example, to allow the user to control the operation of mobile station 18. Alternatively or additionally, user interface 20 may include a keypad, buttons, or other types of controls. Thus, a user may interact with user interface 20 in order to control the operation of mobile station 18 and in order to send or receive voice, video, data, and/or other media, e.g., during communication sessions with other wireless devices, landline stations, or servers.

To enable wireless communication, mobile station 18 may include a transceiver 22 for transmitting and receiving wireless communications (e.g., via an antenna 26). With mobile station 18 operating in sector 12b, as shown in FIG. 1, transceiver 22 may communicate with base station 12, for example, using an air interface format such as 1xRTT CDMA, EVDO, or GSM. More particularly, transceiver 22 may be able to transmit communications using any of a number of different uplink carrier frequencies and may be able to receive communications using any of a number of different downlink carrier frequencies.

The functioning of mobile station 18 may be controlled by the controller 24. Controller 24 may be implemented by hardware, firmware, and/or software. In an exemplary embodiment, controller 24 includes a processor 28 and data storage 30. The data storage 30 may store software instructions that can be executed by processor 28 to control mobile station 18. The software instructions stored in data storage 30 may include a downlink hashing algorithm 32 and an uplink hashing algorithm. In addition to software instructions, data storage 30 also store data or other information. For example, data storage may store one or more identifiers 36, which may be used by hashing algorithms 32 and 34. Identifier(s) 36 may include an MDN, MIN, IMSI, ESN, and/or other identifiers of mobile station 18.

Controller 24 may be communicatively coupled to user interface 20 and to transceiver 22. Thus, controller 24 may control mobile station 18 in response to user input received by user interface 20 and/or in response to wireless communications received by transceiver 22. More particularly, controller 24 may be configured to control mobile station 18 in response to receiving one or more frequency listings via transceiver 22, for example, as described above with reference to FIG. 2.

Thus, controller 24 may use downlink hashing algorithm 32, to select a downlink carrier frequency, from among the frequencies identified in the one or more frequency listings, for receiving communications via transceiver 22. Similarly, controller 24 may use uplink hashing algorithm 34, to select an uplink carrier frequency, from among the frequencies identified in the one or more frequency listings, for transmitting communications via transceiver 22. Controller 24 may apply hashing algorithms 32 and 34 to identifier(s) 36 in order to make these selections.

Controller 24 may then instruct transceiver 22 to use the selected downlink carrier frequency to receive communications, such as monitoring a paging channel for communications from base station 12. In order to access the wireless network, such as to originate a call, controller may instruct transceiver 22 to transmit using the selected uplink carrier frequency.

It is to be understood that the configuration of mobile station 18 illustrated in FIG. 3 is exemplary only. For example, instead of using separate uplink and downlink hashing algorithms, controller 24 may use the same hashing algorithm for selecting uplink and downlink carrier frequencies. In addition, other variations to the configuration shown in FIG. 3 are possible.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a mobile station in communication with a wireless telecommunications network, said method comprising:
    said mobile station receiving at least one frequency listing from a base station in said wireless telecommunications network, said at least one frequency listing identifying a plurality of carrier frequencies;
    said mobile station selecting a first carrier frequency in said plurality of carrier frequencies, for receiving messages from said base station; and
    said mobile station selecting a second carrier frequency in said plurality of carrier frequencies, for transmitting messages to said base station, wherein said mobile station selects said second carrier frequency independently of said first carrier frequency.

2. The method of claim 1, further comprising:
    said mobile station monitoring a paging channel at said first carrier frequency for messages from said base station.

3. The method of claim 1, further comprising:
    said mobile station using an access channel at said second carrier frequency for transmitting a message to said base station.

4. The method of claim 1, wherein said mobile station selecting a first carrier frequency in said plurality of carrier frequencies comprises:
    said mobile station selecting said first carrier frequency based on an identifier of said mobile station.

5. The method of claim 4, wherein said mobile station selecting said first carrier frequency based on an identifier of said mobile station comprises:
    said mobile station applying a hashing algorithm to said identifier.

6. The method of claim 4, wherein said mobile station selecting a second carrier frequency in said plurality of carrier frequencies comprises:
    said mobile station selecting said second carrier frequency based on said identifier of said mobile station.

7. The method of claim 6, wherein said mobile station selecting said second carrier frequency based on an identifier of said mobile station comprises:
    said mobile station applying a hashing algorithm to said identifier.

8. The method of claim 4, wherein said identifier of said mobile station is a Mobile Directory Dumber (MDN), Mobile Identification Number (MIN), International Mobile Subscriber Identity (IMSI), or Electronic Serial Number (ESN).

9. The method of claim 1, wherein said at least one frequency listing identifies a first set of carrier frequencies in said plurality of carrier frequencies as being downlink carrier frequencies and identifies a second set of carrier frequencies in said plurality of carrier frequencies as being uplink carrier frequencies.

10. The method of claim 9, wherein said mobile station selecting a first carrier frequency in said plurality of carrier frequencies comprises said mobile station selecting said first carrier frequency from among said first set of carrier frequencies, and wherein said mobile station selecting a second carrier frequency in said plurality of carrier frequencies comprises said mobile station selecting said second carrier frequency from among said second set of carrier frequencies.

11. The method of claim 9, wherein said at least one frequency listing comprises:
    a first frequency listing identifying said first set of carrier frequencies; and
    a second frequency listing identifying said second set of carrier frequencies.

12. A method for a mobile station operating in a sector of a wireless telecommunications network, said method comprising:
    before said mobile station begins transmitting to said sector, said mobile station receiving a frequency listing that identifies M downlink carrier frequencies and N uplink carrier frequencies available in said sector;
    said mobile station selecting a downlink frequency from among said M available downlink frequencies; and
    said mobile station selecting an uplink frequency from among said N available uplink frequencies, independently of said downlink frequency, wherein M and N are integers greater than one.

13. The method of claim 12, further comprising:
said mobile station using said downlink frequency to receive at least one communication from said sector.

14. The method of claim 12, further comprising:
said mobile station using said uplink frequency to transmit at least one communication to said sector.

15. The method of claim 12, wherein said mobile station selecting a downlink frequency from among said M available downlink frequencies comprises:
said mobile station using a downlink hashing algorithm to map an identifier of said mobile station to one of said M available downlink frequencies.

16. The method of claim 15, wherein said mobile station selecting an uplink frequency from among said N available uplink frequencies, independently of said downlink frequency, comprises:
said mobile station using an uplink hashing algorithm to map said identifier of said mobile station to one of said N available uplink frequencies.

17. The method of claim 12, wherein M is greater than N.

18. A mobile station, comprising:
a transceiver for transmitting and receiving communications; and
a controller, said controller being configured to:
(a) receive at least one frequency listing via said transceiver, said at least one frequency listing identifying a plurality of carrier frequencies;
(b) select a first carrier frequency in said plurality of carrier frequencies for receiving communications via said transceiver; and
(c) select a second carrier frequency in said plurality of carrier frequencies for transmitting communications via said transceiver, wherein said second carrier frequency is selected independently of said first carrier frequency.

19. The mobile station of claim 18, wherein said controller is configured to use at least one hashing algorithm to select said first and said second carrier frequencies based on an identifier of said mobile station.

\* \* \* \* \*